US011614807B1

(12) United States Patent
Fan

(10) Patent No.: US 11,614,807 B1
(45) Date of Patent: Mar. 28, 2023

(54) MOUSE DEVICE

(71) Applicant: Primax Electronics Ltd., Taipei (TW)

(72) Inventor: Shun-Biao Fan, Taipei (TW)

(73) Assignee: PRIMAX ELECTRONICS LTD., Taipei (TW)

(*) Notice: Subject to any disclaimer, the term of this patent is extended or adjusted under 35 U.S.C. 154(b) by 0 days.

(21) Appl. No.: 17/900,600

(22) Filed: Aug. 31, 2022

(51) Int. Cl.
*G06F 3/0354* (2013.01)
*H01H 13/85* (2006.01)
*H01H 13/04* (2006.01)
*G06F 3/0362* (2013.01)

(52) U.S. Cl.
CPC ......... *G06F 3/03543* (2013.01); *H01H 13/04* (2013.01); *H01H 13/85* (2013.01); *G06F 3/0362* (2013.01); *G06F 2203/0333* (2013.01); *H01H 2227/032* (2013.01)

(58) Field of Classification Search
None
See application file for complete search history.

(56) References Cited

U.S. PATENT DOCUMENTS

| 10,599,238 | B1 * | 3/2020 | Wu | G06F 3/03543 |
| 2004/0189605 | A1 * | 9/2004 | Shih | G06F 3/03543 345/163 |
| 2011/0069008 | A1 * | 3/2011 | Kao | H01H 13/85 345/163 |
| 2012/0105329 | A1 * | 5/2012 | Chang | G06F 3/03543 345/163 |
| 2017/0045959 | A1 * | 2/2017 | Chen | G06F 3/03543 |
| 2017/0300137 | A1 * | 10/2017 | Chen | G06F 3/03543 |
| 2018/0011559 | A1 * | 1/2018 | Li | G06F 3/03543 |
| 2019/0042007 | A1 * | 2/2019 | Lu | G06F 3/033 |

* cited by examiner

*Primary Examiner* — Fred Tzeng
(74) *Attorney, Agent, or Firm* — Kirton McConkie; Evan R. Witt

(57) ABSTRACT

A mouse device includes a casing, a key module and a stopping assembly. The key module includes a switch and a keycap. When the keycap is in a pressable state and the keycap is pressed in response to an external force, the keycap is moved toward the switch to trigger the switch. The stopping assembly is disposed within the casing and aligned with the key module. The stopping assembly includes a movable block, a push block and a stopper. While the movable block is pushed and moved in response to a pushing force, the push block is correspondingly moved. While the push block is moved, the stopper is pushed by the push block, and the stopper is moved toward a region between the keycap and the switch. When the keycap is stopped by the stopper, the keycap is switched from the pressable state to a non-pressable state.

9 Claims, 10 Drawing Sheets

MOUSE DEVICE

FIELD OF THE INVENTION

The present invention relates to an input device, and more particularly to a mouse device.

BACKGROUND OF THE INVENTION

A mouse is used to control a cursor on a computer screen in order to operate the computer. Since 1968, the United States has produced the world's first mouse. After then, the mouse is applied to word processing operations, video games, industrial drawings, drawing design or media production. Consequently, the mouse has become an indispensable part of the computer system. In the early stage, the mouse device uses a trackball to detect the displacement of the mouse. With increasing development of science and technology, an optical module or a laser module is used to detect the displacement of the mouse device in order to enhance the working efficiency. Moreover, for increasing the functionality and convenience of the mouse device, the earliest wired single-key mouse device is gradually evolved into the modern wireless multi-key roller mouse device.

In addition to the left and right keys on the top surface of the casing of the mouse device, the two opposite sides of the casing are further equipped with some additional keys. The functions of the mouse device to be executed by the additional keys on the two opposite sides of the casing of the mouse device can be defined by the user. However, the uses of the additional keys on the two opposite sides of the casing are not friendly to the users. For example, due to the operating habits of different users, the additional keys on the two opposite sides of the casing may be accidentally triggered. For example, if the user is accustomed to operating the keys on the left side of the casing, the keys on the right side of the casing may still be accidentally triggered during use.

Therefore, there is a need of providing an improved mouse device in order to overcome the drawbacks of the conventional technologies.

SUMMARY OF THE INVENTION

An object of the present invention provides a mouse device with plural key modules. The key module of the mouse device can be switched between a pressable state and a non-pressable state.

The other objects and advantages of the present invention will be understood from the disclosed technical features.

In accordance with an aspect of the present invention, a mouse device is provided. The mouse device includes a mouse device. The mouse device includes a casing, at least one key module and at least one stopping assembly. Each of the at least one key module includes a switch and a keycap. The switch is disposed within the casing. The keycap is aligned with the switch. The keycap is exposed outside the casing. When the keycap is in a pressable state and the keycap is pressed in response to an external force, the keycap is moved toward the switch, so that the switch is triggered by the keycap. The at least one stopping assembly is disposed within the casing and aligned with the at least one key module. Each of the at least one stopping assembly includes a movable block, a push block and a stopper. The push block is arranged between the movable block and the stopper. The stopper includes a first stopping part. While the movable block is pushed and moved in response to a pushing force, the push block is correspondingly moved. While the push block is moved, the stopper is pushed by the push block, and the stopper is moved toward a region between the keycap and the switch. While the stopper is moved, the first stopping part is correspondingly moved. When the keycap is stopped by the first stopping part, the keycap is switched from the pressable state to a non-pressable state.

In an embodiment, each of the at least one stopping assembly further includes a positioning element and a protrusion structure. the positioning element is located beside the movable block. The positioning element includes a first positioning recess and a second positioning recess. The protrusion structure is connected with the movable block. While the movable block is moved in a first direction in response to the pushing force, the protrusion structure is detached from the first positioning recess and correspondingly moved to the second positioning recess, and the push block is correspondingly moved in a second direction. While the push block is moved, the stopper is pushed by the push block and moved to the region between the keycap and the switch in the second direction. While the stopper is moved, the first stopping part is correspondingly moved. When the keycap is stopped by the first stopping part, the keycap is switched from the pressable state to the non-pressable state. The first direction and the second direction are perpendicular to each other.

In an embodiment, while the movable block is moved in a third direction opposite to the first direction in response to the pushing force, the protrusion structure is detached from the second positioning recess and correspondingly moved to the first positioning recess, and the push block is correspondingly moved in a fourth direction opposite to the second direction. While the push block is moved, the stopper is pushed by the push block and moved in a direction away from the region between the keycap and the switch in the fourth direction. While the stopper is moved, the first stopping part is correspondingly moved, wherein when the keycap is not stopped by the first stopping part, the keycap is switched from the non-pressable state to the pressable state. The third direction and the fourth direction are perpendicular to each other.

In an embodiment, each of the at least one stopping assembly further includes a support element and an elastic element. The support element is arranged between the stopper and the push block. The elastic element is arranged between the support element and the push block. While the movable block is moved in the first direction in response to the pushing force and the push block is correspondingly moved in the second direction, the elastic element is compressed between the push block and the support element to generate an elastic restoring force. While the movable block is moved in the third direction in response to the pushing force, the elastic element is released, and the push block is correspondingly moved in the fourth direction in response to the elastic restoring force.

In an embodiment, the movable block has a first slant surface, and the push block has a second slant surface corresponding to the first slant surface.

In an embodiment, the keycap includes a rib, and the rib is extended in a direction toward the switch. When the keycap is stopped by the first stopping part of the stopper, the rib is contacted with the first stopping part.

In an embodiment, each of the at least one stopping assembly further includes an operating rod. The operating rod is connected with the movable block. The movable block is arranged between the operating rod and the push block.

The operating rod is extended in a direction away from the movable block. The operating rod is exposed outside a bottom side of the casing.

In an embodiment, the at least one key module includes plural key modules. A first key module and a second key module of the plural key modules are located at a side of the casing. The stopper of the corresponding stopping assembly further includes a second stopping part. While the movable block is pushed and moved in response to the pushing force, the push block is correspondingly moved. While the push block is moved, the stopper is pushed by the push block, and the stopper is moved toward the region between the keycap and the switch of the first key module and the region between the keycap and the switch of the second key module. While the stopper is moved, the first stopping part and the second stopping part are correspondingly moved. When the keycap of the first key module and the keycap of the second key module are respectively stopped by the first stopping part and the second stopping part, the keycap of the first key module and the keycap of the second key module are switched from the pressable state to the non-pressable state.

In an embodiment, the mouse device further includes a key plate, wherein the key plate covers a top side of the casing, and the key plate is arranged between the plural key modules. When each of the plural key modules is pressed down, the mouse device issues a first key signal. When the key plate is pressed down, the mouse device issues a second key signal. The second key signal is different from the first key signal.

From the above descriptions, the present invention provides the mouse device. By means of the stopping assembly, the key module of the mouse device can be switched between the pressable state and the non-pressable state. Due to this structural design, some or all of the key modules of the mouse device can be selectively switched to the non-pressable state by the user according to the use habit. During the process of using the mouse device, the user will not accidentally press the unnecessary key module. Consequently, the convenience of using the mouse device is largely enhanced.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
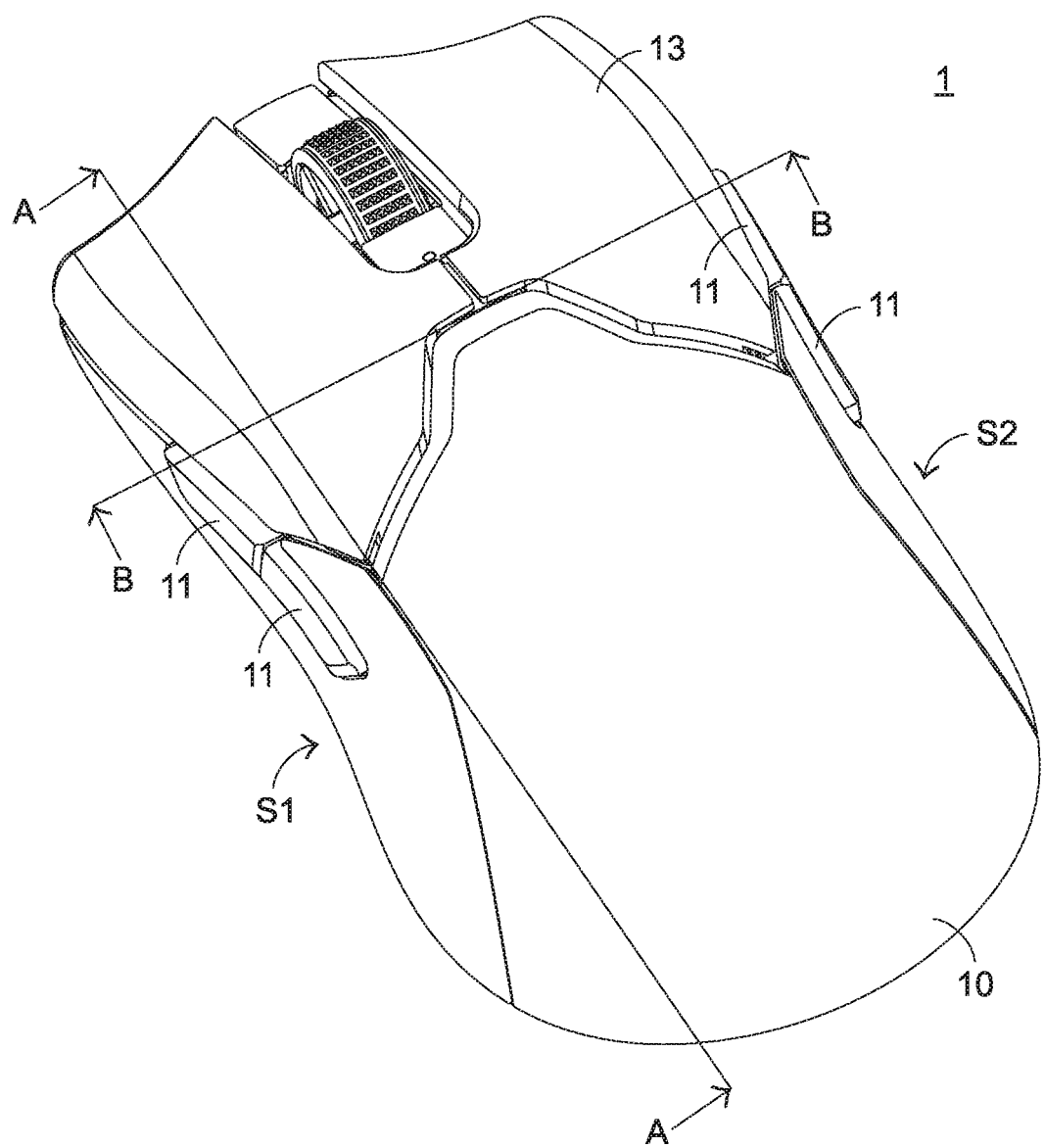
FIG. 1 is a schematic perspective view illustrating the appearance of a mouse device according to an embodiment of the present invention.
Figure 2:
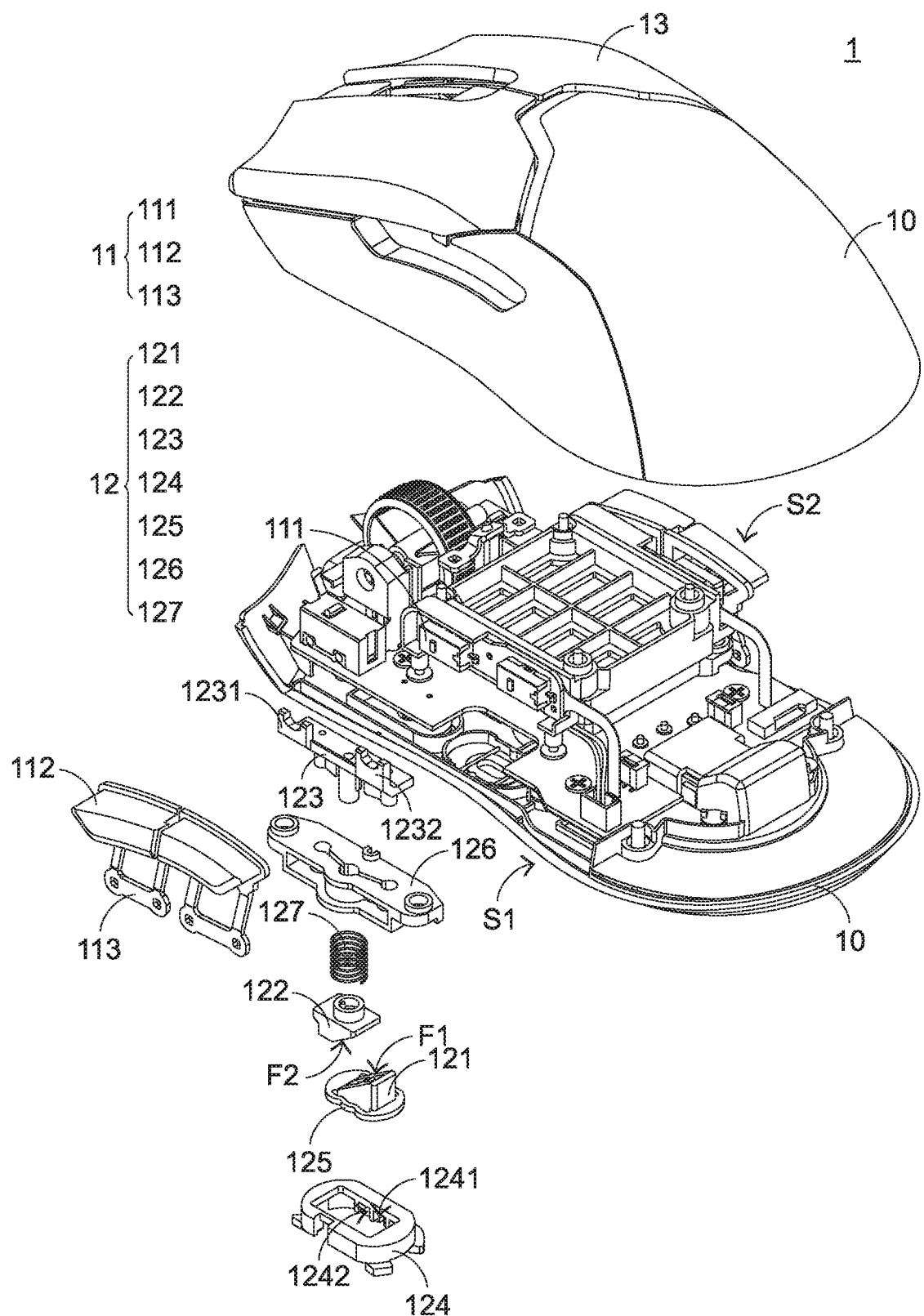
FIG. 2 is a schematic exploded view illustrating the components of the mouse device as shown in FIG. 1 and taken along a viewpoint.
Figure 3:
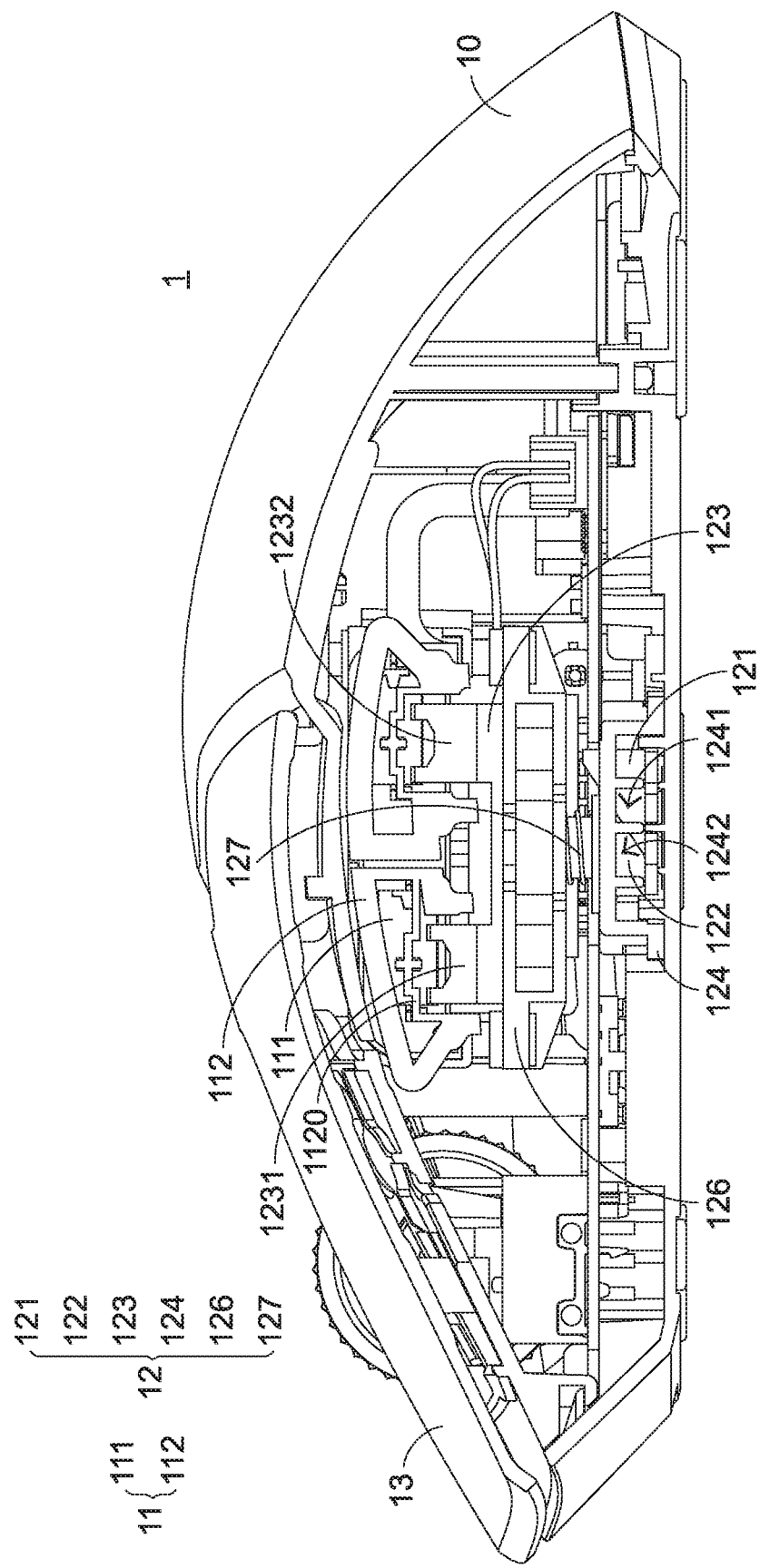
FIG. 3 is a schematic cutaway view illustrating the mouse device as shown in FIG. 1 and taken along a line AA.
Figure 4:
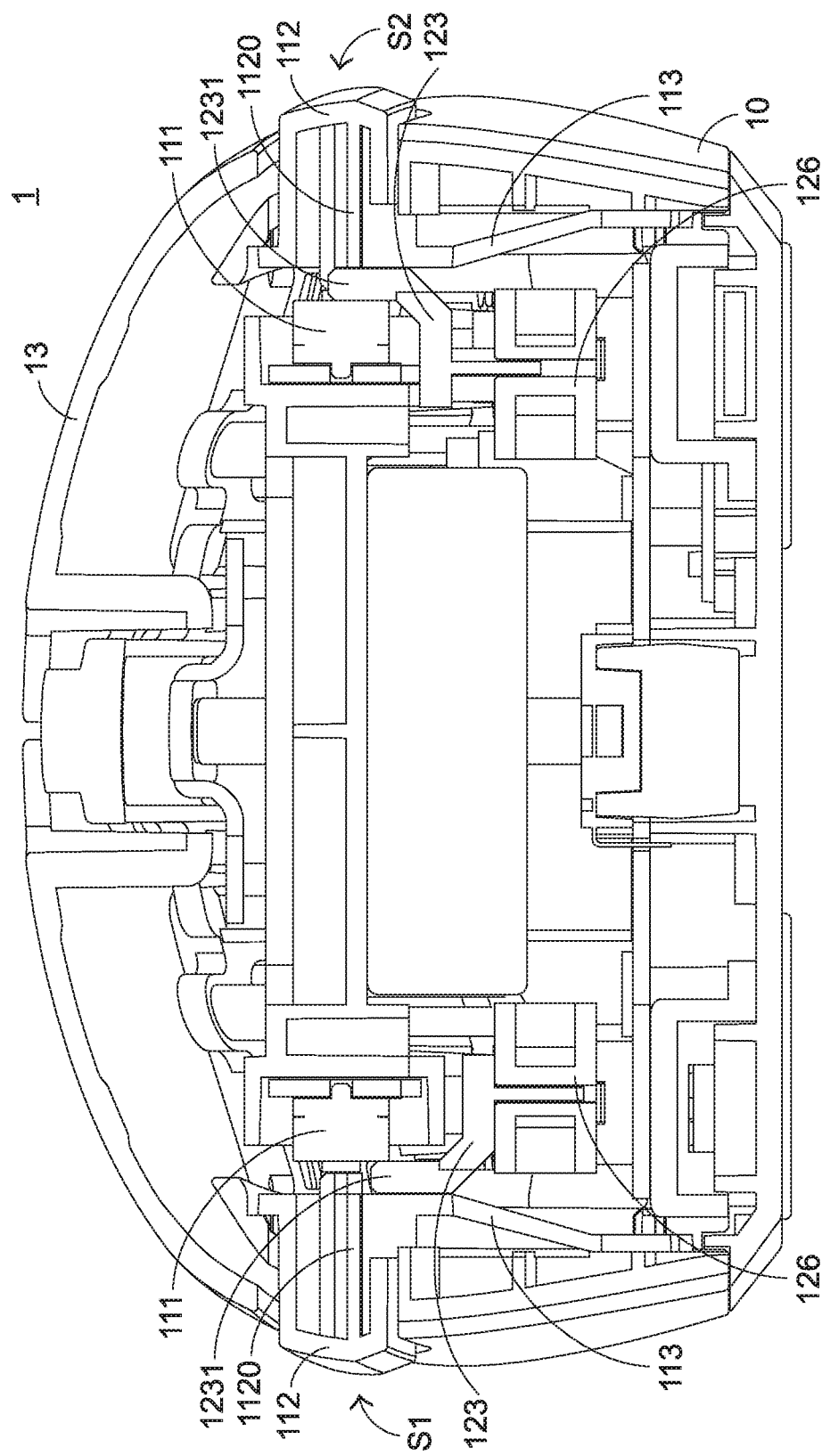
FIG. 4 is a schematic cutaway view illustrating the mouse device as shown in FIG. 1 and taken along a line BB.
Figure 5:
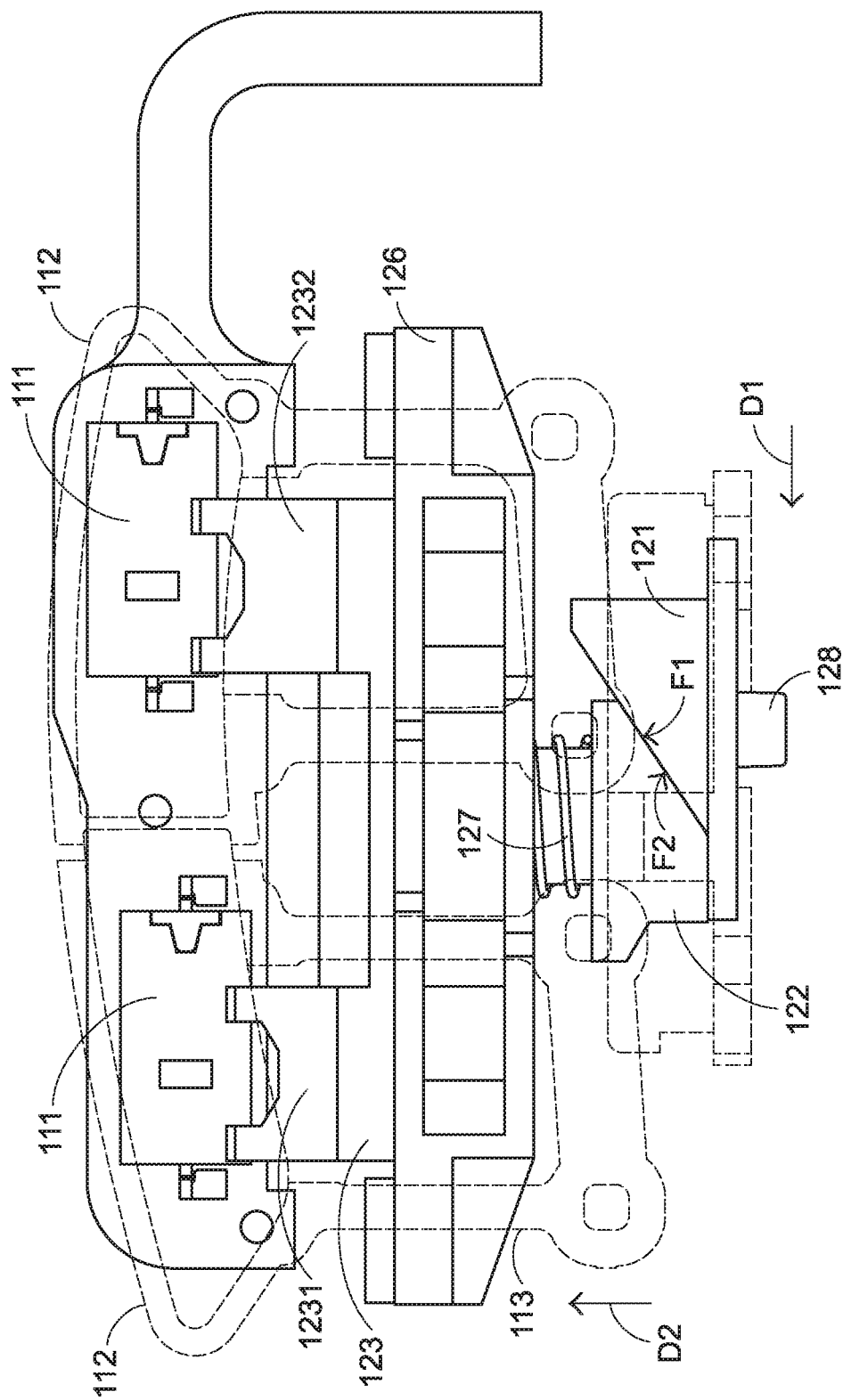
FIGS. 5 and 6 schematically illustrate the actions of a stopping assembly of the mouse device as shown in FIG. 2.
Figure 6:
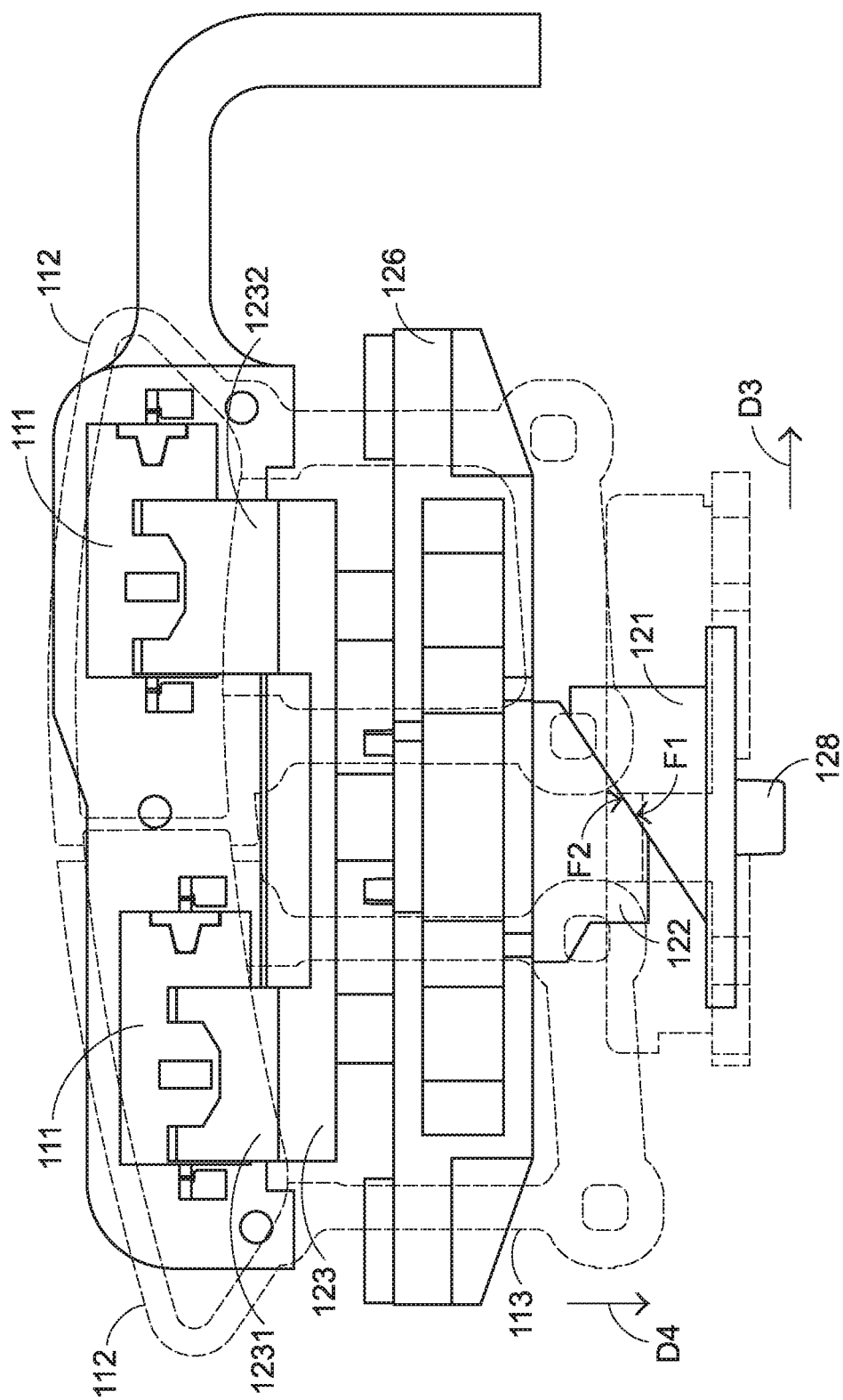
Figure 7:
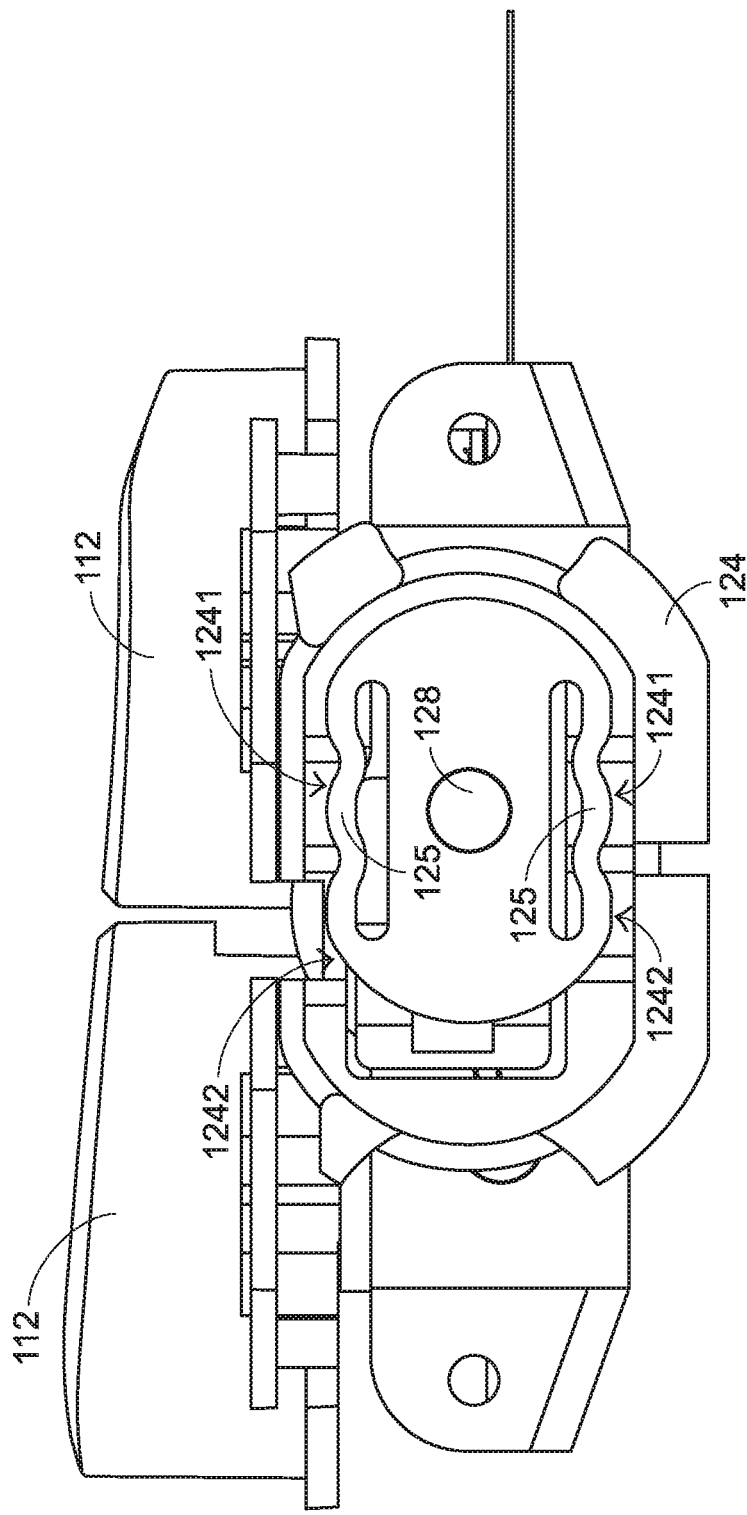
FIG. 7 is a schematic bottom view illustrating the stopping assembly as shown in FIG. 5.
Figure 8:
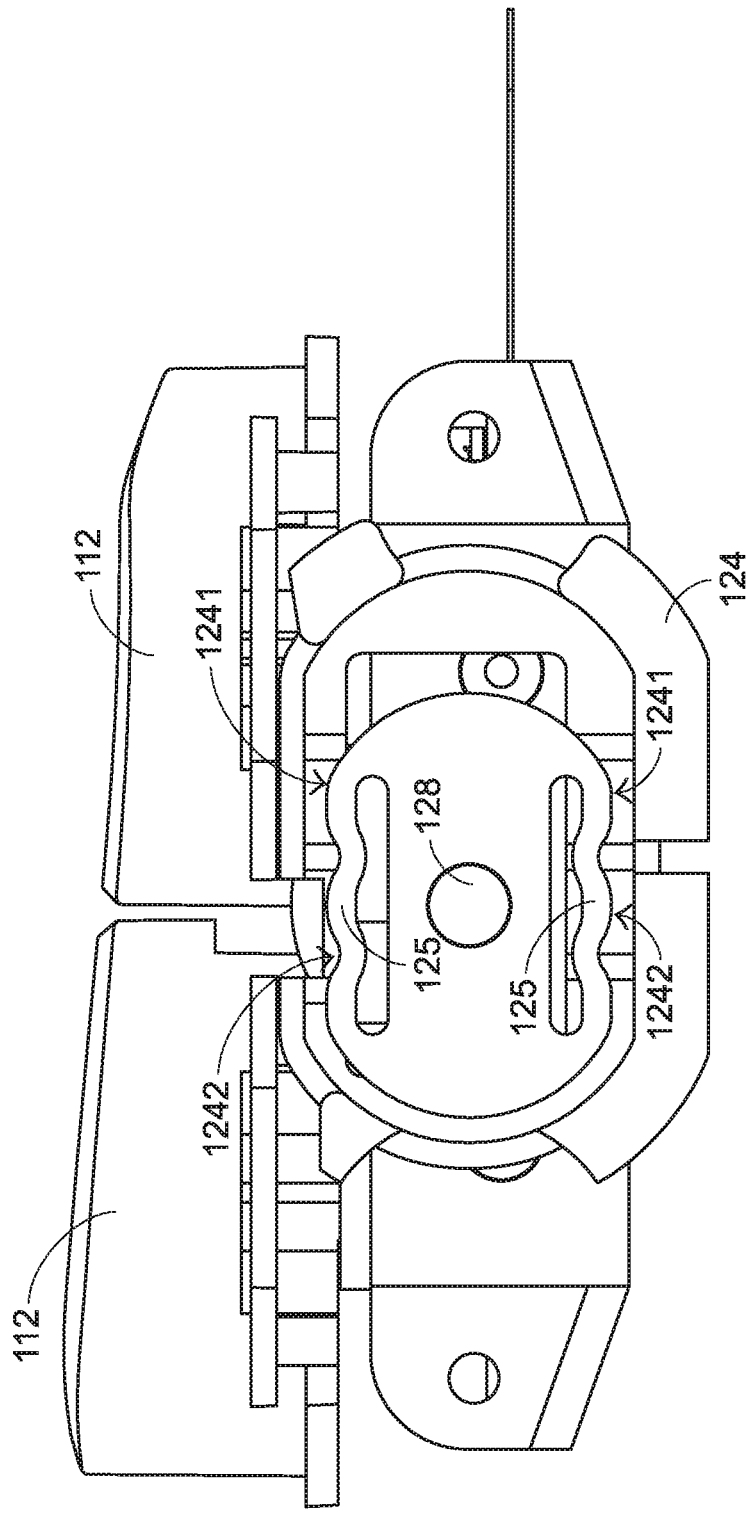
FIG. 8 is a schematic bottom view illustrating the stopping assembly as shown in FIG. 6.

Please refer to FIGS. 1 to 8. FIG. 1 is a schematic perspective view illustrating the appearance of a mouse device according to an embodiment of the present invention. FIG. 2 is a schematic exploded view illustrating the components of the mouse device as shown in FIG. 1 and taken along a viewpoint. FIG. 3 is a schematic cutaway view illustrating the mouse device as shown in FIG. 1 and taken along a line AA. FIG. 4 is a schematic cutaway view illustrating the mouse device as shown in FIG. 1 and taken along a line BB. FIGS. 5 and 6 schematically illustrate the actions of a stopping assembly of the mouse device as shown in FIG. 2. FIG. 7 is a schematic bottom view illustrating the stopping assembly as shown in FIG. 5. FIG. 8 is a schematic bottom view illustrating the stopping assembly as shown in FIG. 6.

As shown in FIGS. 1 to 8, the mouse device 1 comprises a casing 10, at least one key module 11 and at least one stopping assembly 12.

Each key module 11 comprises a switch 111 and a keycap 112. The switch 111 is disposed within the casing 10. The keycap 112 is aligned with the switch 111. Moreover, the keycap 112 is exposed outside the casing 10. Consequently, the keycap 112 can be pressed down by user.

Each stopping assembly 12 is disposed within the casing 11 and aligned with one or more key modules 11. The stopping assembly 12 comprises a movable block 121, a push block 122 and a stopper 123. The push block 122 of the stopping assembly 12 is arranged between the movable block 121 and the stopper 123. Moreover, the stopper 123 comprises a first stopping part 1231 and a second stopping part 1232.

In this embodiment, the at least one key module 11 includes four key modules 11, and the at least one stopping assembly 12 includes two stopping assemblies 12. The four key modules 11 are divided into two groups. That is, each group includes two key modules 11. The two groups of key modules 11 are respectively installed on a first lateral side S1 and a second lateral side S2 of the casing 10. The first lateral side S1 and the second lateral side S2 are opposed to each other. One of the two stopping assemblies 12 is aligned with the two corresponding key modules 11 on the first lateral side S1 of the casing 10. The other of the two stopping assemblies 12 is aligned with the two corresponding key modules 11 on the second lateral side S2 of the casing 10. It is noted that the number of the key modules 11 is not restricted to 4, and the number of the stopping assemblies 12 is not restricted to 2. That is, the number of the key modules 11 and the number of the stopping assemblies 12 are not restricted. For example, in some other embodiments, the mouse device 1 comprises one, two or at least four key modules 11 and one or at least two stopping assemblies 12. In case that the mouse device 1 comprises one key module 11 and one stopping assembly 12, the stopper of the stopping assembly 12 comprises only one stopping part. That is, the stopping assembly 12 equipped with one of the first stopping part 1231 and the second stopping part 1232 is feasible.

When the key module 11 is in the pressable state and the keycap 112 is pressed in response to an external force, the keycap 112 is moved in a direction toward the switch 111 to trigger the switch 111. Moreover, the keycap 112 is connected with the inner structure of the casing 10 through an elastic bracket 113. While the keycap 122 is moved toward the switch 111, the elastic bracket 113 is correspondingly subjected to deformation. When the external force applied to the keycap 112 is released, the keycap 112 is moved in a direction away from the switch 111 in response to an elastic restoring force of the elastic bracket 113 from the deformation state. Consequently, the keycap 112 is moved in the direction away from the switch 111 and returned to its original position.

When the movable block 121 of the stopping assembly 12 is pushed in response to a pushing force, the movable block 121 is moved, and the push block 122 is correspondingly moved with the movable block 121. While the push block 122 is moved, the stopper 123 is pushed by the push block 122. Consequently, the stopper 123 is moved in the direction toward the region between the keycap 112 and the switch 111. As the stopper 123 is moved, the first stopping part 1231 and the second stopping part 1232 are correspondingly moved. When the keycaps 112 of the two adjacent key modules 11 are respectively stopped by the first stopping part 1231 and the second stopping part 1232, the keycaps 112 of the two adjacent key modules 11 are switched from the pressable state to the non-pressable state.

The other structures of the mouse device 1 and the actions of the stopping assembly 12 will be described in more details as follows.

Please refer to FIGS. 2 to 8 again. In an embodiment, the stopping assembly 12 further comprises a positioning element 124 and a protrusion structure 125. The positioning element 124 is located beside the movable block 121. Moreover, the positioning element 124 comprises a first positioning recess 1241 and a second positioning recess 1242. The protrusion structure 125 is connected with the movable block 121. For example, the protrusion structure 125 is located at a side of the movable block 121. Moreover, the protrusion structure 125 is aligned with the first positioning recess 1241 or the second positioning recess 1242. When the protrusion structure 125 is inserted in the first positioning recess 1241 or the second positioning recess 1242, the movable block 121 is well positioned. That is, the movable block 121 is not shifted in response to a small shaking action.

Please refer to FIGS. 2 to 8 again. In an embodiment, the stopping assembly 12 further comprises a support element 126 and an elastic element 127. The support element 126 is arranged between the stopper 123 and the push block 122. The elastic element 127 is arranged between the support element 126 and the push block 122. The elastic element 127 provides an elastic restoring force to the push block 122. Particularly, the stopper 123 is inserted in the support element 126 from the top side of the support element 126, and the push block 122 is inserted in the support element 126 from the bottom side of the support element 126. After the stopper 123 and the push block 122 are inserted in the support element 126, the stopper 123 and the push block 122 are connected with each other.

Please refer to FIGS. 2 to 8 again. In an embodiment, the stopping assembly 12 further comprises an operating rod 128. The operating rod 128 is connected with the movable block 121. The movable block 121 is arranged between the operating rod 128 and the push block 122. The operating rod 128 is extended in the direction away from the movable block 121. Moreover, the operating rod 128 is exposed outside the bottom side of the casing 10. When the operating rod 128 is moved by the user, the movable block 121 is correspondingly moved.

Please refer to FIGS. 2 to 8 again. In an embodiment, the movable block 121 has a first slant surface F1, and the push block 122 has a second slant surface F2. The first slant surface F1 of the movable block 121 and the second slant surface F2 of the push block 122 are aligned with each other. While the movable block 121 is pushed in response to the pushing force, the first slant surface F1 of the movable block 121 and the second slant surface F2 of the push block 122 are moved along each other.

Please refer to FIGS. 3 and 4 again. In an embodiment, the keycap 112 further comprises a rib 1120. The rib 1120 is extended in the direction toward the switch 111. When the keycap 112 is stopped by the first stopping part 1231 or the second stopping part 1232, the rib 1120 of the keycap 112 is contacted with the first stopping part 1231 or the second stopping part 1232. Since the keycap 112 is effectively stopped by the first stopping part 1231 or the second stopping part 1232, the keycap 112 is switched from the pressable state to the non-pressable state.

For example, as shown in FIG. 4, the key module 11 at the first lateral side S1 of the casing 10 is in the pressable state. Under this circumstance, the top surface of the first stopping part 1231 is located at a level lower than the rib 1120 of the keycap 112. That is, the top surface of the first stopping part 1231 is located below the rib 1120 of the keycap 112. Since the keycap 112 is not stopped by the first stopping part 1231, the keycap 112 is in the pressable state. On the other hand, the key module 11 at the second lateral side S2 of the casing 10 is in the non-pressable state. Under this circumstance, the top surface of the first stopping part 1231 is located at a level higher than the rib 1120 of the keycap 112. That is, the top surface of the first stopping part 1231 is located above the rib 1120 of the keycap 112. Since the keycap 112 is stopped by the first stopping part 1231, the keycap 112 is in the non-pressable state.

Please refer to FIGS. 1, 2, 3 and 4 again. In an embodiment, the mouse device 1 further comprises a key plate 13. The key plate 13 covers a top side of the casing 10. Moreover, the key plate 13 is arranged between the plural key modules 11. When each of the plural key modules 11 is pressed down, the mouse device 1 outputs a first key signal to a computing device that is connected with the mouse device 1. According to the first key signal, the computing device executes the corresponding command or function. When the key plate 13 is pressed down, the mouse device 1 outputs a second key signal to the computing device that is connected with the mouse device 1. The second key signal is different from the first key signal. According to the second key signal, the computing device executes the corresponding command or function.

Please refer to FIGS. 5, 6, 7 and 8 again. A process of switching the key module 11 (or the keycap 112) from the pressable state as shown in FIG. 5 to the non-pressable state as shown in FIG. 6 will be described as follows. Firstly, the operating rod 128 exposed outside the bottom side of the casing 10 is operated by the user, and the movable block 121 is correspondingly moved in a first direction D1. While the movable block 121 is moved in the first direction D1, the protrusion structure 125 is detached from the first positioning recess 1241 of the positioning element 124 (see FIG. 7) and then inserted in the second positioning recess 1242 of the positioning element 124 (see FIG. 8). Moreover, while the movable block 121 is moved in the first direction D1, the push block 122 is pushed by the movable block 121. Consequently, the push block 122 is moved upwardly in a second direction D2. That is, while the first slant surface F1 of the movable block 121 and the second slant surface F2 of the push block 122 are moved along each other, the first direction D1 corresponding to the horizontal movement is transformed into the second direction D2 corresponding to the vertical movement. Moreover, while the push block 122 is moved upwardly, the elastic element 127 is compressed between the push block 122 and the support element 126. Moreover, while the push block 122 is moved upwardly, the stopper 123 is moved upwardly in the second direction D2 and moved toward the region between the keycap 112 and the switch 111. While the stopper 123 is moved upwardly, the first stopping part 1231 and the second stopping part 1232 are moved upwardly. When the keycaps 112 of the two adjacent key modules 11 are respectively stopped by the first stopping part 1231 and the second stopping part 1232, the two adjacent key modules 11 are switched from the pressable state as shown in FIG. 5 to the non-pressable state as shown in FIG. 6.

Moreover, a process of switching the key module 11 (or the keycap 112) from the non-pressable state as shown in FIG. 6 to the pressable state as shown in FIG. 5 will be described as follows. Firstly, the operating rod 128 exposed outside the bottom side of the casing 10 is operated by the user, and the movable block 121 is correspondingly moved in a third direction D3. The third direction D3 is opposite to the first direction D1. While the movable block 121 is moved in the third direction D3, the protrusion structure 125 is detached from the second positioning recess 1242 of the positioning element 124 and then inserted in the first positioning recess 1241 of the positioning element 124. As the movable block 121 is moved, the compressed elastic element 127 is released. In response to the elastic restoring force of the elastic element 127 and the weight of the push block 122, the push block 122 is moved downwardly in a fourth direction D4. The fourth direction D4 is opposite to the second direction D2. The third direction D3 and the fourth direction D4 are perpendicular to each other. While the push block 122 is moved downwardly, the stopper 123 is moved downwardly in the fourth direction D4 and moved in the direction away from the region between the keycap 112 and the switch 111. While the stopper 123 is moved downwardly, the first stopping part 1231 and the second stopping part 1232 are moved downwardly. When the keycaps 112 of the two adjacent key modules 11 are not respectively stopped by the first stopping part 1231 and the second stopping part 1232, the two adjacent key modules 11 are switched from the non-pressable state as shown in FIG. 6 to the pressable state as shown in FIG. 5.

Figure 9A:
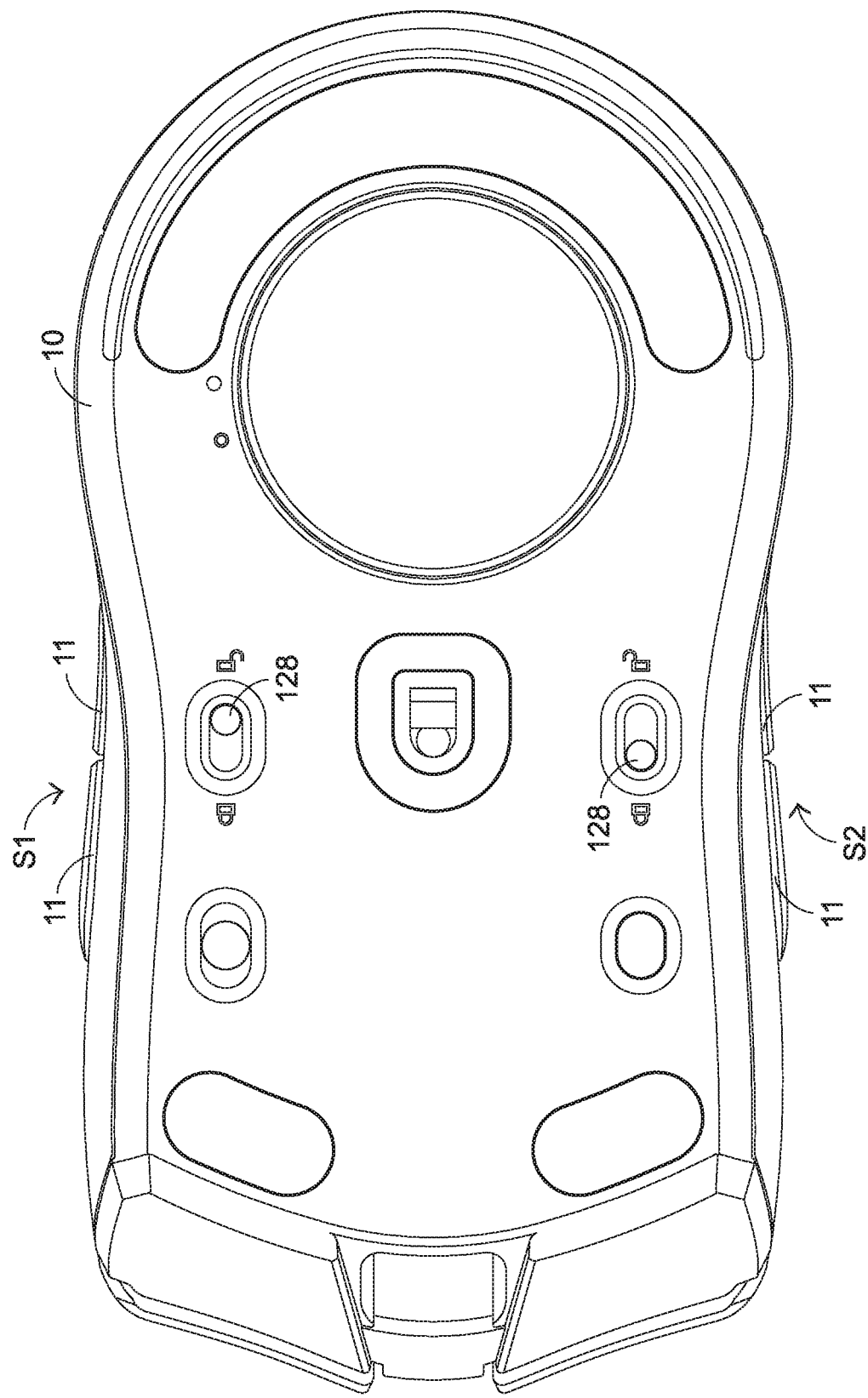
FIGS. 9A and 9B schematically illustrate the structures of the mouse device as shown in FIG. 1 in different use scenarios.
Figure 9B:
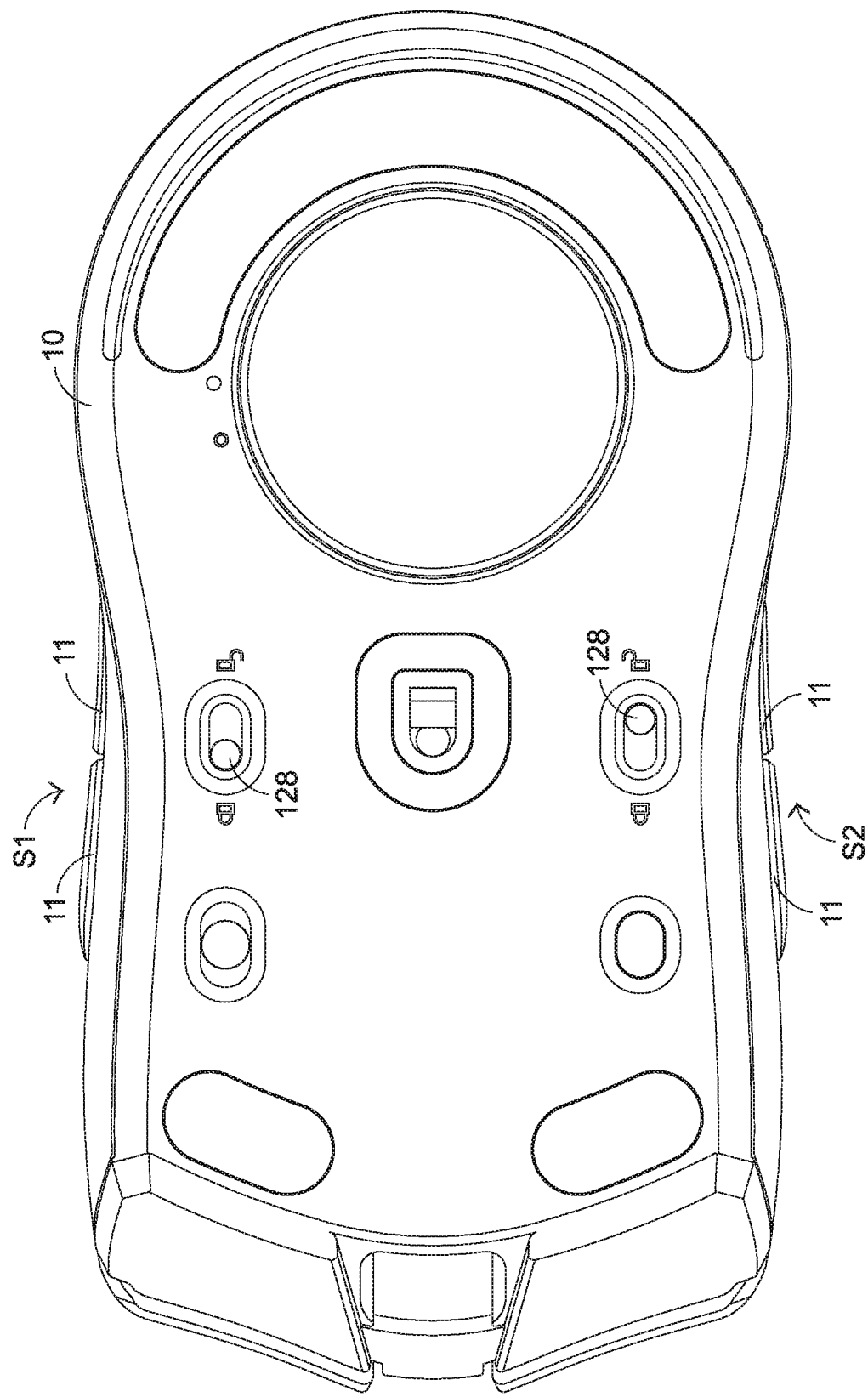

FIGS. 9A and 9B schematically illustrate the structures of the mouse device as shown in FIG. 1 in different use scenarios. Please refer to FIGS. 9A and 9B and FIGS. 1 to 8.

In the use scenario of FIG. 9A, the key modules 11 at the first lateral side S1 of the casing 10 are in the pressable state, and the key modules 11 at the second lateral side S2 of the casing 10 are in the non-pressable state. For operating the mouse device 1 in this use scenario, the following process will be performed. Firstly, the operating rod 128 at the first lateral side S1 of the casing 10 is moved to an unlocked position by the user. That is, the operating rod 128 is moved in the third direction D3 as shown in FIG. 6, and the movable block 121 is correspondingly moved in the third direction D3. The unlocked position indicates that the key modules 11 at the first lateral side S1 of the casing 10 are in the pressable state. Then, the operating rod 128 at the second lateral side S2 of the casing 10 is moved to a locked position by the user. That is, the operating rod 128 is moved in the first direction D1 as shown in FIG. 5, and the movable block 121 is correspondingly moved in the first direction D1. The locked position indicates that the key modules 11 at the second lateral side S2 of the casing 10 are in the non-pressable state.

In the use scenario of FIG. 9B, the key modules 11 at the first lateral side S1 of the casing 10 are in the non-pressable state, and the key modules 11 at the second lateral side S2 of the casing 10 are in the pressable state. For operating the mouse device 1 in this use scenario, the following process will be performed. Firstly, the operating rod 128 at the first lateral side S1 of the casing 10 is moved to the locked position by the user. That is, the operating rod 128 is moved in the first direction D1 as shown in FIG. 5, and the movable block 121 is correspondingly moved in the first direction D1. Then, the operating rod 128 at the second lateral side S2 of the casing 10 is moved to the unlocked position by the user. That is, the operating rod 128 is moved in the third direction D3 as shown in FIG. 6, and the movable block 121 is correspondingly moved in the third direction D3.

In the use scenario of FIG. 9A, the key modules 11 at the first lateral side S1 of the casing 10 are in the pressable state, and the key modules 11 at the second lateral side S2 of the casing 10 are in the non-pressable state. Under this circumstance, the mouse device 1 is suitably used by the right-handed users. In the use scenario of FIG. 9B, the key modules 11 at the first lateral side S1 of the casing 10 are in the non-pressable state, and the key modules 11 at the second lateral side S2 of the casing 10 are in the pressable state. Under this circumstance, the mouse device 1 is suitably used by the left-handed users.

It is noted that the use scenarios of the mouse device 1 are not restricted to the above use scenarios. For example, in another use scenario, the key modules 11 at the first lateral side S1 of the casing 10 and the key modules 11 at the second lateral side S2 of the casing 10 are all in the pressable state. Alternatively, in a further use scenario, the key modules 11 at the first lateral side S1 of the casing 10 and the key modules 11 at the second lateral side S2 of the casing 10 are all in the non-pressable state.

From the above descriptions, the present invention provides the mouse device. By means of the stopping assembly, the key module of the mouse device can be switched between the pressable state and the non-pressable state. Due to this structural design, some or all of the key modules of the mouse device can be selectively switched to the non-pressable state by the user according to the use habit. During the process of using the mouse device, the user will not accidentally press the unnecessary key module. Consequently, the convenience of using the mouse device is largely enhanced.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A mouse device, comprising:
   a casing;
   at least one key module, wherein each of the at least one key module comprises a switch and a keycap, wherein the switch is disposed within the casing, the keycap is aligned with the switch, and the keycap is exposed outside the casing, wherein when the keycap is in a pressable state and the keycap is pressed in response to an external force, the keycap is moved toward the switch, so that the switch is triggered by the keycap; and at least one stopping assembly disposed within the casing and aligned with the at least one key module, wherein each of the at least one stopping assembly comprises a movable block, a push block and a stopper, wherein the push block is arranged between the movable block and the stopper, and the stopper comprises a first stopping part, wherein while the movable block is pushed and moved in response to a pushing force, the push block is correspondingly moved, wherein while the push block is moved, the stopper is pushed by the push block, and the stopper is moved toward a region between the keycap and the switch, wherein while the stopper is moved, the first stopping part is correspondingly moved, wherein when the keycap is stopped by the first stopping part, the keycap is switched from the pressable state to a non-pressable state.

2. The mouse device according to claim 1, wherein each of the at least one stopping assembly further comprises a positioning element and a protrusion structure, wherein the positioning element is located beside the movable block, the positioning element comprises a first positioning recess and a second positioning recess, and the protrusion structure is connected with the movable block, wherein while the movable block is moved in a first direction in response to the pushing force, the protrusion structure is detached from the first positioning recess and correspondingly moved to the second positioning recess, and the push block is correspondingly moved in a second direction, wherein while the push block is moved, the stopper is pushed by the push block and moved to the region between the keycap and the switch in the second direction, wherein while the stopper is moved, the first stopping part is correspondingly moved, wherein when the keycap is stopped by the first stopping part, the keycap is switched from the pressable state to the non-pressable state, wherein the first direction and the second direction are perpendicular to each other.

3. The mouse device according to claim 2, wherein while the movable block is moved in a third direction opposite to the first direction in response to the pushing force, the protrusion structure is detached from the second positioning recess and correspondingly moved to the first positioning recess, and the push block is correspondingly moved in a fourth direction opposite to the second direction, wherein while the push block is moved, the stopper is pushed by the push block and moved in a direction away from the region between the keycap and the switch in the fourth direction, wherein while the stopper is moved, the first stopping part is correspondingly moved, wherein when the keycap is not stopped by the first stopping part, the keycap is switched from the non-pressable state to the pressable state, wherein the third direction and the fourth direction are perpendicular to each other.

4. The mouse device according to claim 3, wherein each of the at least one stopping assembly further comprises a support element and an elastic element, wherein the support element is arranged between the stopper and the push block, and the elastic element is arranged between the support element and the push block, wherein while the movable block is moved in the first direction in response to the pushing force and the push block is correspondingly moved in the second direction, the elastic element is compressed between the push block and the support element to generate an elastic restoring force, wherein while the movable block is moved in the third direction in response to the pushing force, the elastic element is released, and the push block is correspondingly moved in the fourth direction in response to the elastic restoring force.

5. The mouse device according to claim 1, wherein the movable block has a first slant surface, and the push block has a second slant surface corresponding to the first slant surface.

6. The mouse device according to claim 1, wherein the keycap comprises a rib, and the rib is extended in a direction toward the switch, wherein when the keycap is stopped by the first stopping part of the stopper, the rib is contacted with the first stopping part.

7. The mouse device according to claim 1, wherein each of the at least one stopping assembly further comprises an operating rod, wherein the operating rod is connected with the movable block, the movable block is arranged between the operating rod and the push block, the operating rod is extended in a direction away from the movable block, and the operating rod is exposed outside a bottom side of the casing.

8. The mouse device according to claim 1, wherein the at least one key module includes plural key modules, wherein a first key module and a second key module of the plural key modules are located at a side of the casing, and the stopper of the corresponding stopping assembly further comprises a second stopping part, wherein while the movable block is pushed and moved in response to the pushing force, the push block is correspondingly moved, wherein while the push block is moved, the stopper is pushed by the push block, and the stopper is moved toward the region between the keycap and the switch of the first key module and the region between the keycap and the switch of the second key module, wherein while the stopper is moved, the first stopping part and the second stopping part are correspondingly moved, wherein when the keycap of the first key module and the keycap of the second key module are respectively stopped by the first stopping part and the second stopping part, the keycap of the first key module and the keycap of the second key module are switched from the pressable state to the non-pressable state.

9. The mouse device according to claim 8, wherein the mouse device further comprises a key plate, wherein the key plate covers a top side of the casing, and the key plate is arranged between the plural key modules, wherein when each of the plural key modules is pressed down, the mouse device issues a first key signal, wherein when the key plate is pressed down, the mouse device issues a second key signal, wherein the second key signal is different from the first key signal.

* * * * *